(12) United States Patent
Nguyen

(10) Patent No.: US 10,167,681 B2
(45) Date of Patent: Jan. 1, 2019

(54) CONNECTOR SYSTEM

(71) Applicant: Cameron International Corporation, Houston, TX (US)

(72) Inventor: Dennis P. Nguyen, Pearland, TX (US)

(73) Assignee: Cameron International Corporation, Houston, TX (US)

( * ) Notice: Subject to any disclaimer, the term of this patent is extended or adjusted under 35 U.S.C. 154(b) by 467 days.

(21) Appl. No.: 14/587,912

(22) Filed: Dec. 31, 2014

(65) Prior Publication Data

US 2016/0186503 A1 Jun. 30, 2016

(51) Int. Cl.
| | | |
|---|---|---|
| *E21B 33/038* | (2006.01) | |
| *E21B 17/046* | (2006.01) | |
| *F16L 25/00* | (2006.01) | |
| *F16L 37/15* | (2006.01) | |

(52) U.S. Cl.
CPC .......... *E21B 17/046* (2013.01); *E21B 33/038* (2013.01); *F16L 25/009* (2013.01); *F16L 37/15* (2013.01)

(58) Field of Classification Search
CPC .... E21B 17/046; E21B 33/038; F16L 25/009; F16L 37/15
USPC ................. 285/338, 342, 330, 321
See application file for complete search history.

(56) References Cited

U.S. PATENT DOCUMENTS

| | | | |
|---|---|---|---|
| 4,681,166 A | | 7/1987 | Cuiper |
| 4,819,967 A | * | 4/1989 | Calder ................. E21B 33/038 285/123.3 |
| 4,902,044 A | * | 2/1990 | Williams .............. E21B 33/038 166/340 |
| 5,259,459 A | | 11/1993 | Valka |
| 6,073,974 A | * | 6/2000 | Meisinger ........... F16L 37/1215 285/316 |
| 6,554,324 B1 | * | 4/2003 | Herman ................ E21B 33/038 285/123.11 |
| 8,100,437 B2 | * | 1/2012 | Beard ................... E21B 17/085 285/108 |
| 2001/0038206 A1 | * | 11/2001 | Olechnowicz ........ F16L 19/005 285/328 |
| 2002/0100596 A1 | * | 8/2002 | Nguyen ................ E21B 33/038 166/382 |
| 2007/0052237 A1 | * | 3/2007 | Udhofer .............. F16L 19/0231 285/387 |
| 2009/0140519 A1 | * | 6/2009 | Pavnaskar .............. F16L 37/23 285/308 |
| 2010/0183360 A1 | | 7/2010 | Nguyen et al. |

(Continued)

FOREIGN PATENT DOCUMENTS

WO  WO 2008154076 A1 * 12/2008 ........... E21B 33/038

OTHER PUBLICATIONS

PCT International Search Report and Written Opinion; Application No. PCT/US2015/064831; dated Mar. 24, 2016; 12 pages.

*Primary Examiner* — D. Andrews
*Assistant Examiner* — Yanick A Akaragwe
(74) *Attorney, Agent, or Firm* — Fletcher Yoder, P.C.

(57) ABSTRACT

A system including a connector system configured to couple a first tubular to a second tubular, including a sleeve configured to couple to an exterior surface of the first tubular, wherein the sleeve comprises a coupling feature, a lock ring configured to couple to the exterior surface of the second tubular and radially engage the coupling feature on the sleeve, and a support ring configured to energize the lock ring into engagement with the sleeve.

17 Claims, 5 Drawing Sheets

(56) References Cited

U.S. PATENT DOCUMENTS

| | | | | |
|---|---|---|---|---|
| 2011/0175348 A1* | 7/2011 | Bogert | ............... | F16L 19/10 |
| | | | | 285/313 |
| 2012/0326439 A1* | 12/2012 | Bogert | ............... | F16L 19/12 |
| | | | | 285/354 |
| 2013/0076028 A1* | 3/2013 | Pallini, Jr. | ............ | E21B 17/085 |
| | | | | 285/343 |
| 2013/0233534 A1* | 9/2013 | Trevino | ............ | E21B 33/0422 |
| | | | | 166/75.14 |
| 2013/0264070 A1* | 10/2013 | Miller | ................ | E21B 17/02 |
| | | | | 166/378 |
| 2013/0299186 A1* | 11/2013 | Nguyen | ............ | E21B 33/038 |
| | | | | 166/378 |
| 2014/0103640 A1* | 4/2014 | O'Dell | ............ | E21B 17/046 |
| | | | | 285/91 |
| 2014/0251631 A1* | 9/2014 | Curtiss, III | ........ | E21B 43/0122 |
| | | | | 166/338 |
| 2015/0152985 A1* | 6/2015 | Koditkar | ............. | F16L 15/08 |
| | | | | 285/390 |
| 2015/0330169 A1* | 11/2015 | Coutts, Jr. | .......... | E21B 33/03 |
| | | | | 166/378 |
| 2016/0123103 A1* | 5/2016 | Puccio | ............ | E21B 33/038 |
| | | | | 166/379 |
| 2016/0177651 A1* | 6/2016 | Lyle | ............... | E21B 33/038 |
| | | | | 166/345 |
| 2016/0273290 A1* | 9/2016 | Harms | ............... | E21B 23/02 |

\* cited by examiner

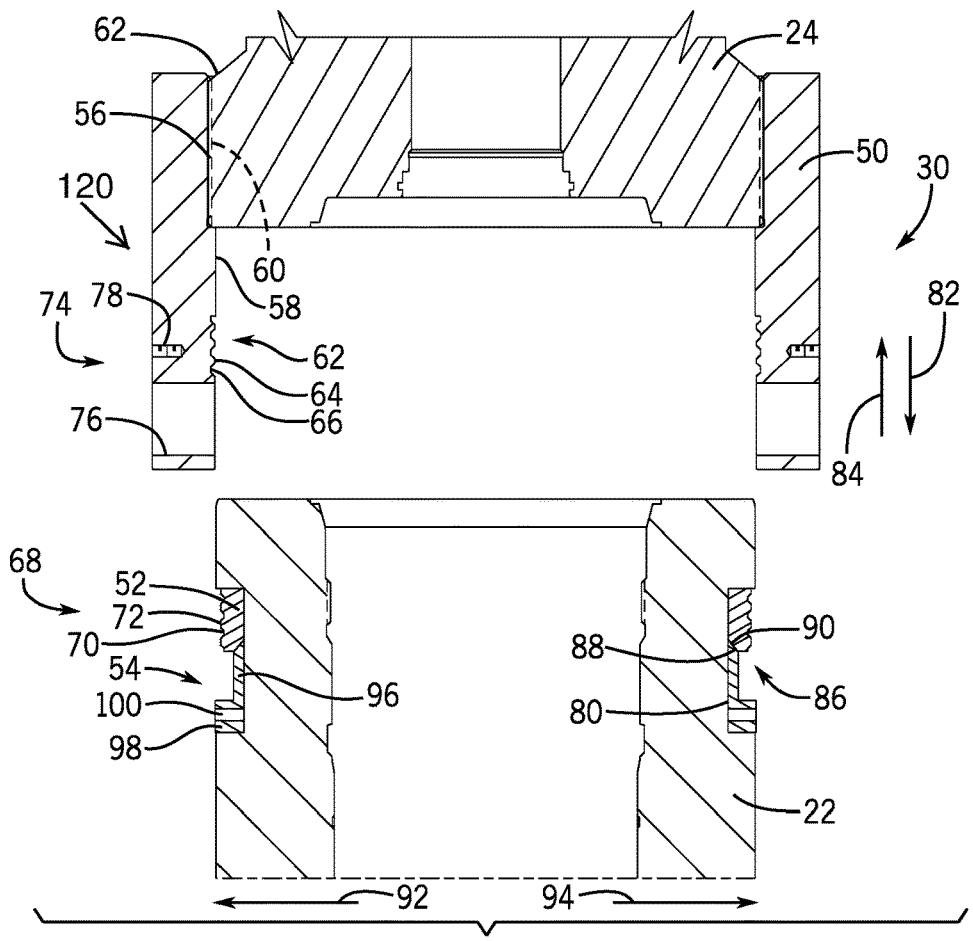
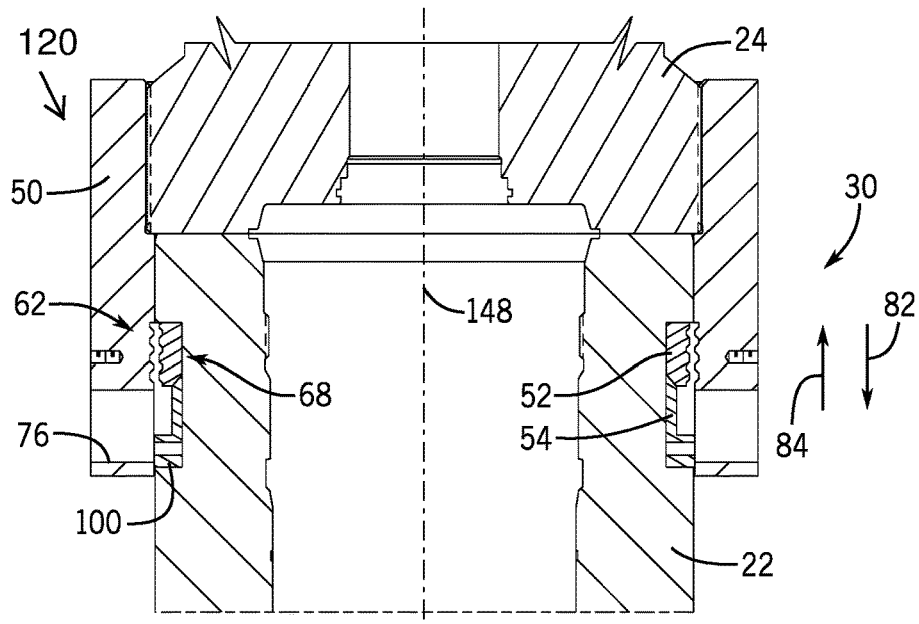

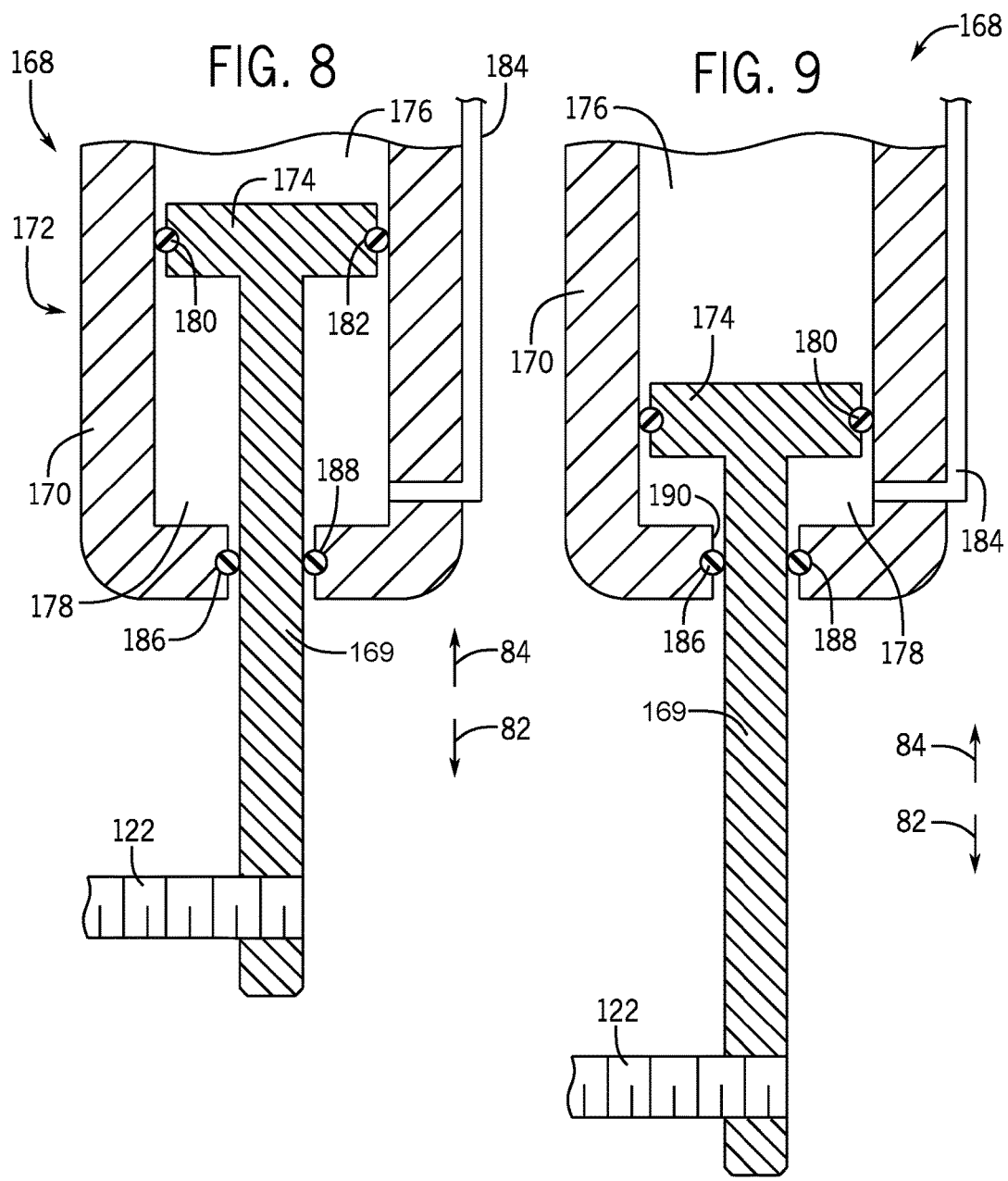

CONNECTOR SYSTEM

BACKGROUND

This section is intended to introduce the reader to various aspects of art that may be related to various aspects of the present invention, which are described and/or claimed below. This discussion is believed to be helpful in providing the reader with background information to facilitate a better understanding of the various aspects of the present invention. Accordingly, it should be understood that these statements are to be read in this light, and not as admissions of prior art.

Drilling and production systems use various pipes, spools, etc. to support the flow of fluids in and out of a well. The pipes, spools, etc. may be coupled together to extend length, form strings of tubing, etc. to enable various flows in and out a well. The connections between the pipes, spools, etc. benefit from strength and stability, to support high loads and stress in harsh operating environments.

BRIEF DESCRIPTION OF THE DRAWINGS

Various features, aspects, and advantages of the present invention will become better understood when the following detailed description is read with reference to the accompanying figures in which like characters represent like parts throughout the figures, wherein:

FIG. 2 is a cross-sectional side view of an embodiment of a connector system with a first tubular axially separated from a second tubular;

FIG. 3 is a cross-sectional side view of an embodiment of a connector system with a first tubular landed on a second tubular;

FIG. 8 is a cross-sectional view of a hydraulic system in a first position; and

FIG. 9 is a cross-sectional view of a hydraulic system in a second position.

DETAILED DESCRIPTION OF SPECIFIC EMBODIMENTS

One or more specific embodiments of the present invention will be described below. These described embodiments are only exemplary of the present invention. Additionally, in an effort to provide a concise description of these exemplary embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

The disclosed embodiments include a connector system that enables hydrocarbon extraction system components to couple together. For example, the connector system may form a strong and stable connection between a tubing spool and a casing spool. As will be explained in detail below, the exemplary connection system includes a sleeve coupled to a first tubular that engages a lock ring on a second tubular. For example, the sleeve may include a coupling feature that enables a lock ring to couple to the sleeve, blocking axial movement of the sleeve. The lock ring is energized by a support ring that drives the lock ring radially outward and into engagement with the sleeve, while simultaneously blocking retraction of the lock ring. For example, the support ring may move radially inside the lock ring, which blocks the lock ring from moving radially inward. In some embodiments, the coupling feature on the sleeve and the lock ring may be threaded to facilitate preloading of the first and second tubular. For example, after connecting the tubular with the connection system, the first tubular, the second tubular, or both tubulars may be rotated to increase the tension on the connector system, increasing the strength of the connection or coupling.

Figure 1:
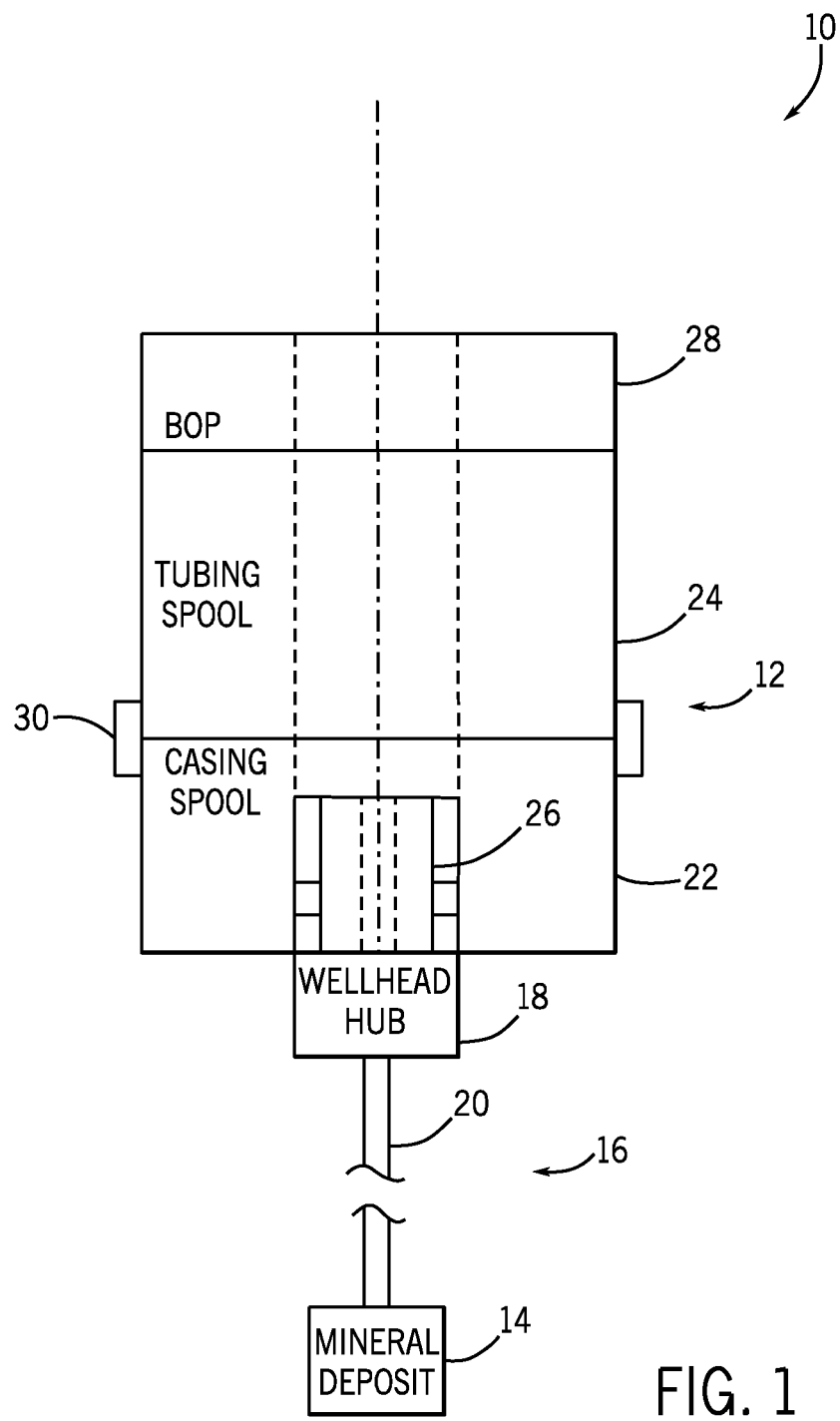
FIG. 1 is a block diagram of an embodiment of a mineral extraction system with a connector system.

FIG. 1 is a block diagram that illustrates a hydrocarbon extraction system 10 (e.g., mineral extraction system) that can extract various minerals and natural resources, including hydrocarbons (e.g., oil and/or natural gas), from the earth. The hydrocarbon extraction system 10 may be land-based (e.g., a surface system) or subsea (e.g., a subsea system). The system 10 includes a wellhead 12 coupled to a mineral deposit 14 via a well 16, wherein the well 16 includes a wellhead hub 18 and a well-bore 20. The wellhead hub 18 includes a large diameter hub at the end of the well-bore 20 that enables the wellhead 12 to couple to the well 16. The wellhead 12 typically includes multiple components that control and regulate activities and conditions associated with the well 16. For example, the wellhead 12 includes a casing spool 22 (e.g., tubular), a tubing spool 24 (e.g., tubular), a hanger 26 (e.g., a tubing hanger or a casing hanger), a blowout preventer (BOP) 28, and a "Christmas" tree to control the flow of fluids into and out of the well. As will be explained in detail below, the hydrocarbon extraction system 10 includes a connection system 30 that facilitates coupling of various components within the hydrocarbon extraction system 10. For example, the connection system 10 may enable the casing spool 22 to couple to the tubing spool 24.

FIG. 2 is a cross-sectional side view of an embodiment of the connector system 30. The connector system 30 includes a sleeve 50, a lock ring 52 (e.g., c-ring), and a support ring 54 (e.g., c-ring). As illustrated, the sleeve 50 includes threads 56 on an inner surface 58 (e.g., inner annular surface or circumference) that engage threads 60 on an outer surface 62 (e.g., outer annular surface or circumference) of the tubing spool 24. In some embodiments, the sleeve 50 and tubing spool 24 may be a one-piece structure. In other embodiments, the sleeve 50 may be part of or coupled to the casing spool 22. The sleeve 50 includes a sleeve coupling feature 62 (e.g., an annular groove, annular grooves and protrusions, etc.) that enables the lock ring 52 to couple to the sleeve 50. For example, the coupling feature 62 may include a series of annular protrusions 64 and annular recesses 66 (e.g., threads) that engage a corresponding lock ring coupling feature 68 with annular recesses 70 and annular protrusions 72 (e.g., threads, or teeth). In some embodiments, the coupling feature 62 may be a groove that receives the lock ring 52. The sleeve 50 may also include various tool apertures 74 that enable a tool to couple to and energize the connector system 30. For example, the sleeve 50 may include a first aperture 76 that enables a tool to couple to the support ring 54 through the sleeve 50, while a second aperture 78 enables the tool to couple to the sleeve 50.

As illustrated, the lock ring 52 and the support ring 54 rest within a groove 80 on the casing spool 22. The groove 80 enables the sleeve 50 to slide axially over the casing spool 22 in direction 82 to align the coupling feature 62 on the sleeve 50 with the coupling feature 68 on the lock ring 52. Once aligned, the support ring 54 energizes the lock ring 52 by moving in axial direction 84. The support ring 54 contacts the lock ring 52 along an angled interface 86 (e.g., curved annular interface or conical interface) formed by a support ring angled surface 88 and a lock ring angled surface 90. The angled interface 86 enables the support ring 54 to slide past the lock ring 52, driving the lock ring 52 radially outward in directions 92 and 94. In some embodiments, the support ring 54 may include an interface section 96 (e.g., annular extension portion) with the angled surface 88, and a base portion 98 (e.g., annular flange portion) that interacts with a tool. As illustrated, the base portion 98 may include an aperture 100 that enables the tool to couple to the support ring 54. In operation, the tool couples to the aperture 100 in order to drive the support ring 54 in axial direction 84 into a position circumferentially within the lock ring 52.

Figure 4:
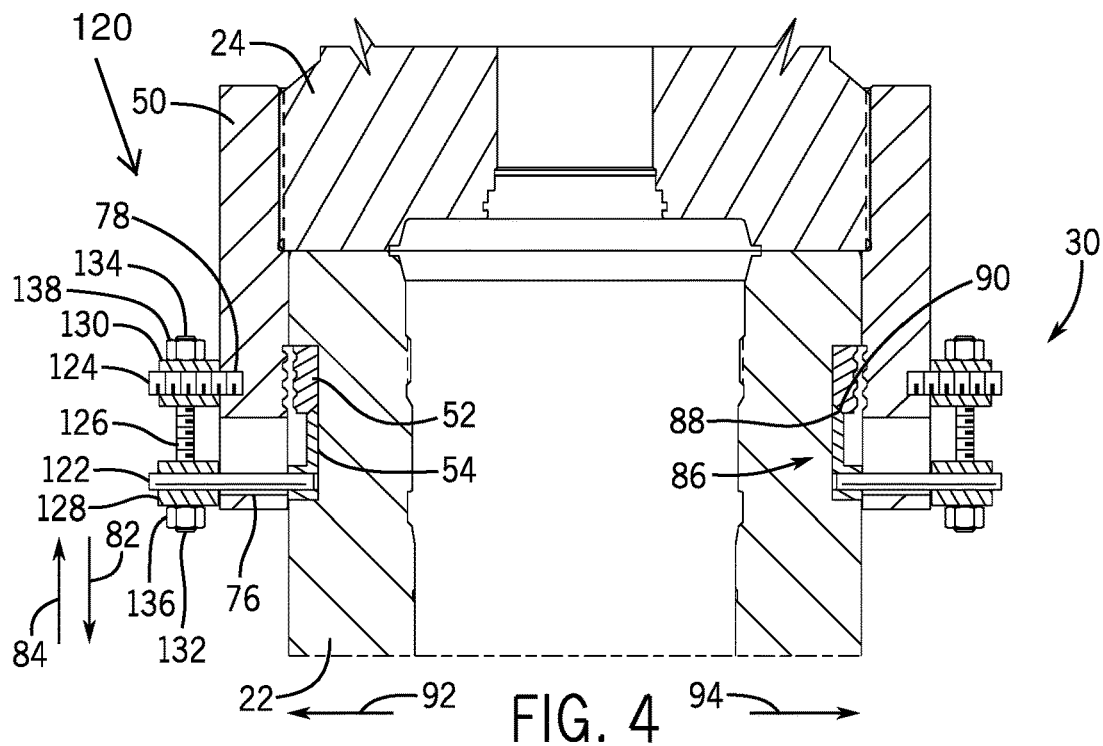
FIG. 4 is a partial cross-sectional side view of an embodiment of an unenergized connector system coupled to a tool.

FIG. 3 is a cross-sectional side view of an embodiment of the connector system 30 with the tubing spool 24 landed on the casing spool 22. In this position, the coupling features 62 and 68 on the respective sleeve 50 and lock ring 52 align in axial direction 82 along axis 148. Moreover, the aperture 76 aligns with the support ring 54 in the axial direction 82, thereby providing the tool access to the aperture 100. FIG. 4 is a partial cross-sectional side view of the tool 120 coupled to the connector system 30 in accordance with certain embodiments. The tool 120 couples to the connector system 30 with a first stud 122 and a second stud 124. As illustrated, the first stud 122 couples to the aperture 100 in the support ring 54 by extending through the first aperture 76 in the sleeve 50. The second stud 124 couples to the sleeve 50 by entering the second aperture 78. As illustrated, the first and second studs 122, 124 are linked with a threaded bolt 126 that extends through first and second blocks 128, 130. Connected to first and second ends 132, 134 of the threaded bolt 126 are first and second nuts 136, 138. In operation, the first nut 136 rotates driving the first block 128 in axial direction 84. Movement of the first block 128 in axial direction 84 in turn drives the stud 122 in direction 84, which then drives the support ring 54 in axial direction 84. As the support ring 54 moves in axial direction 84, the angled surface 88 slides past the angled surface 90, driving the lock ring 52 radially outward in directions 92, 94 coupling the lock ring 52 to the sleeve 50. In other words, the support ring 54 moves from a position axially offset from the lock ring 52 to an axially overlapping position in which the rings 52, 54 are partially or entirely overlapping in the axial direction (e.g., partially or entirely concentric). In some embodiments, the first stud 122 may not be threaded to facilitate assembly and disassembly of the tool 120. In other embodiments, the first stud 122 may be partially threaded or completely threaded enabling the first stud 122 to threadingly couple to the support ring 54, the first block 128, or both. The second stud 124 may also be threaded to provide a stable connection to the sleeve 50 and the second block 130.

Figure 5:
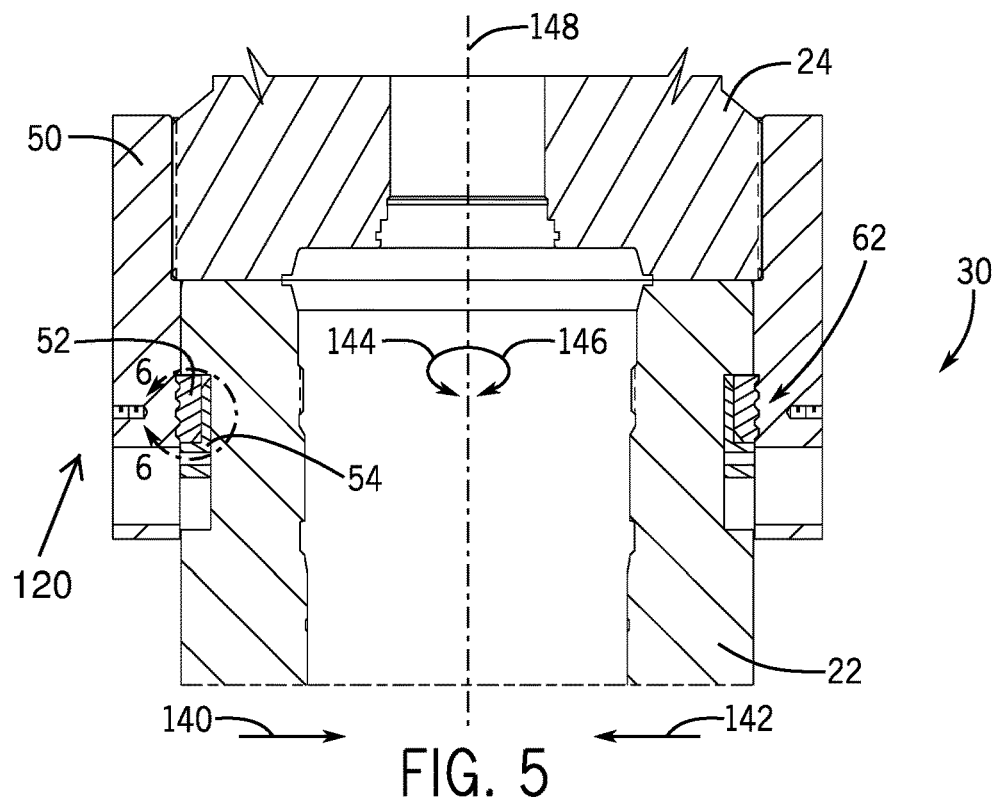
FIG. 5 is a cross-sectional side view of an embodiment of a connector system in an energized state coupling the first tubular to the second tubular.

FIG. 5 is a cross-sectional side view of an embodiment of a connector system 30 in an energized state. In the energized state, the support ring 54 retains the lock ring 52 in the coupling feature 62 by blocking radial movement of the lock ring 52 in directions 140 and 142. In this position, the casing spool 22 and tubing spool 24 are coupled together with the connector system 30. In some embodiments, after actuation of the connector system 30, the tubing spool 24 or casing spool 22 may be rotated in either direction 144 or 146 about the axis 148 to preload the casing spool 22 and the tubing spool 24 (e.g., increase contact stress between the casing spool 22 and the tubing spool 24). As explained above, the coupling feature 62 may include threads that engage threads on the lock ring 52. Accordingly, as the tubing spool 24 or casing spool 22 rotates, the threads preload the connector system 30 between the tubing spool 24 and casing spool 22.

Figure 6:
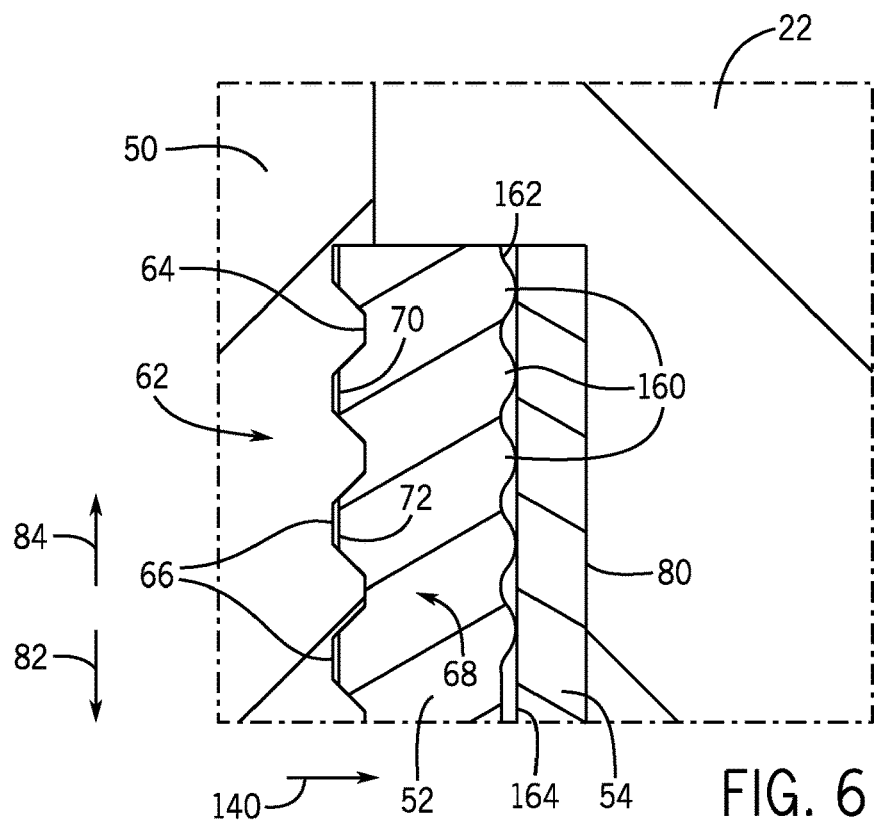
FIG. 6 is a detail view within line 6-6 of FIG. 5, illustrating an embodiment of the connector system in a locked or energized position.

FIG. 6 is a detail view within line 6-6 of FIG. 5 of an embodiment of the connector system 30 in a locked or energized position. As illustrated, the lock ring 52 is forced radially into contact with the coupling feature 62 on the sleeve 50. In some embodiments, the lock ring 52 may include protrusions 160 (e.g., axially spaced annular protrusions or teeth) on the inner surface 162 (e.g., inner annular surface or circumference) of the lock ring 52. The protrusions 160 may create additional force or friction between the surface 162 of the lock ring 52 and the surface 164 (e.g., outer annular surface or circumference) on the support ring 54 that resists movement of the lock ring 52 in direction 140 and movement of the support ring 54 in direction 82.

Figure 7:
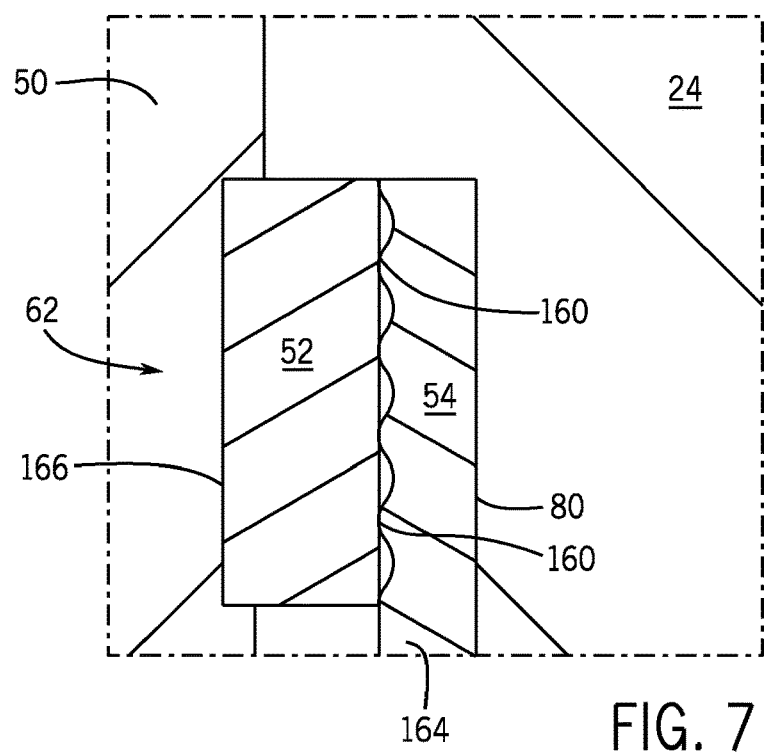
FIG. 7 is a detail view within line 6-6 of FIG. 5, illustrating an embodiment of the connector system in a locked or energized position.

FIG. 7 is a detail view within line 6-6 of FIG. 5 of an embodiment of the connector system 30 in a locked or energized position. As illustrated, the lock ring 52 has a different cross-sectional shape (e.g., square, rectangular, etc.) that engages a coupling feature 62 in the form of a groove 166 (e.g., annular groove). Moreover, the support ring 54 may include the protrusions 160 (e.g., axially spaced annular protrusions or teeth); instead of the lock ring 52. As explained above, these protrusions 160 may remove a gap between the surface 162 of the lock ring 52 and the surface 164 on the support ring 54, and/or increase pressurized contact between the lock ring 52 and the support ring 54 to resist movement of the lock ring 52 in direction 140 and movement of the support ring 54 in direction 82.

FIG. 8 is a cross-sectional view of an actuation system 168 in a first position. As illustrated, the actuation system 168 may use a fluid (e.g., hydraulic fluid) to drive a shaft 169 between first and second axial positions. The actuation system 168 may include a hydraulic housing 170 with a hydraulic cavity 172 (e.g., cylinder) that receives an end portion 174 of the shaft 169. The end portion 174 (e.g., annular piston) divides the hydraulic cavity 172 into a first chamber 176 (e.g., cylinder portion) and a second chamber 178 (e.g., cylinder portion). For example, the end portion 174 may include one or more grooves 180 (e.g., 1, 2, 3, 4, 5, or more annular grooves) that receive one or more gaskets 182 (e.g., 1, 2, 3, 4, 5 or more gaskets or seals) that block fluid flow between the first chamber 176 and the second chamber 178. In operation, hydraulic fluid is pumped into the chambers 176 and 178 to drive the shaft 169 (e.g., piston 174) in axial directions 82 and 84. For example, when fluid is pumped into the chamber 178, through the control line 84, the fluid pressure drives the shaft 169 (e.g., piston 174) in axial direction 84 enabling the shaft 169 to drive the first stud 122 in axial direction 84, which energizes the connector system 30. In order to maintain hydraulic pressure within the chamber 178, the hydraulic housing 170 may include one or more gaskets 186 (e.g., 1, 2, 3, 4, 5, or more annular grooves) that rest within one or more grooves 188 (e.g., 1, 2, 3, 4, 5, or more annular grooves) around the outlet 190. The gasket(s) 186 form a seal around the shaft 169 as the shaft 169 moves axially within the hydraulic housing 170.

FIG. 9 is a cross-sectional view of an actuation system 168 in a second position. As illustrated, the actuation system 168 may also drive the first stud 122 in axial direction 82 to uncouple the connector system 30, by pumping hydraulic fluid into the first chamber 176. The pressure of the hydraulic fluid drives the shaft 169 (e.g., piston 174) in axial direction 82, moving the support ring 54 in axial direction 82. As the support ring 54 moves in axial direction 82, the lock ring 52 may retract in radial directions 140 and 142 enabling the tubing spool 24 (e.g., tubular) to separate from the casing spool 22 (e.g., tubular).

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

The invention claimed is:

1. A system, comprising:
a connector system configured to couple a first tubular component to a second tubular component, comprising:
a sleeve configured to couple to a first exterior surface of the first tubular component, wherein the sleeve comprises a coupling feature, and the sleeve comprises a first tool coupling configured to couple with a tool;
a lock ring configured to couple to a second exterior surface of the second tubular component, wherein the lock ring comprises a first tapered surface, and the lock ring is configured to move along a first path of movement in an outward radial direction and radially engage the coupling feature on the sleeve; and
a support ring comprising a second tapered surface and a second tool coupling configured to couple with the tool, wherein the sleeve is configured to be disposed about both the lock ring and the support ring to align the tool with the support ring, wherein the support ring is configured to move along a second path of movement in an axial direction in response to the tool, engage the second tapered surface against the first tapered surface, and drive the lock ring along the first path of movement in the outward radial direction into engagement with the coupling feature of the sleeve.

2. The system of claim 1, wherein the lock ring comprises one or more protrusions configured to engage the sleeve, and the coupling feature comprises one or more grooves configured to receive the lock ring.

3. The system of claim 1, wherein the first tool coupling of the sleeve comprises a first radial tool coupling.

4. The system of claim 3, wherein the second tool coupling of the support ring comprises a second radial tool coupling.

5. The system of claim 4, wherein the sleeve comprises a radial aperture configured to pass a radial portion of the tool through the sleeve and couple to the second radial tool coupling of the support ring.

6. The system of claim 5, wherein the first radial tool coupling is disposed on an exterior surface of the sleeve.

7. The system of claim 1, comprising the tool coupled with the first tool coupling of the sleeve, wherein the tool has a radial portion and an axial drive portion configured to move the radial portion along a third path of movement in the axial direction to drive the support ring along the second path of movement.

8. The system of claim 7, wherein the axial drive portion comprises a threaded shaft oriented in the axial direction, and the radial portion comprises a stud oriented in the outward radial direction.

9. The system of claim 1, wherein the coupling feature comprises first threads and the lock ring comprises second threads, and the first and second threads engage one another to engage the first tubular component to be compressed against the second tubular component.

10. The system of claim 7, wherein the axial drive portion comprises a piston in a housing, and the piston is configured to move in the axial direction in response to a fluid pressure.

11. A system, comprising:
a mineral extraction system, comprising:
a first tubular component;
a second tubular component comprising an annular groove; and
a connector system configured to couple the first tubular component to the second tubular component, comprising:
a sleeve configured to couple to the first tubular component, wherein the sleeve comprises a coupling feature;
a lock ring configured to be disposed in the annular groove of the second tubular component radially between the second tubular component and the sleeve, wherein the lock ring comprises a first tapered surface, and the lock ring is configured to move along a first path of movement in an outward radial direction and radially engage the coupling feature on the sleeve; and
a support ring configured to be disposed in the annular groove of the second tubular component adjacent the lock ring and radially between the second tubular component and the sleeve, wherein the sleeve is configured to be disposed about both the lock ring and the support ring, wherein the support ring comprises a second tapered surface, wherein the support ring is configured to move along a second path of movement in an axial direction, engage the second tapered surface against the first tapered surface, and drive the lock ring along the first path of movement in the outward radial direction into engagement with the coupling feature of the sleeve.

12. The system of claim 11, wherein the coupling feature comprises one or more grooves configured to receive the lock ring.

13. The system of claim 11, wherein the sleeve comprises a first tool coupling and the support ring comprises a second tool coupling, and the first and second tool couplings are configured to couple with a tool configured to drive movement of the support ring along the second path of movement.

14. The system of claim 13, wherein the first tool coupling comprises a first radial tool coupling and the second tool coupling comprises a second radial tool coupling.

15. The system of claim 11, comprising a tool coupled to an outer circumference of the sleeve, wherein the tool has a radial portion and an axial drive portion configured to move the radial portion along a third path of movement in the axial direction to drive the support ring along the second path of movement.

16. The system of claim 15, wherein the axial drive portion comprises a threaded shaft oriented in the axial direction, and the radial portion comprises a stud oriented in the outward radial direction.

17. The system of claim 15, wherein the axial drive portion comprises a piston in a housing, and the piston is configured to move in the axial direction in response to a fluid pressure.

* * * * *